United States Patent [19]

Gillbrand

[11] Patent Number: 5,458,855
[45] Date of Patent: Oct. 17, 1995

[54] DEVICE FOR SUPPLYING EXTRA AIR IN EXHAUST GASES FROM CAR ENGINES UPSTREAM FROM A CATALYTIC CLEANER

[75] Inventor: Per Gillbrand, Mariefred, Sweden

[73] Assignee: Saab Automobile Aktiebolag, Sweden

[21] Appl. No.: 178,236

[22] PCT Filed: Jul. 3, 1992

[86] PCT No.: PCT/SE92/00500

§ 371 Date: Jan. 10, 1994

§ 102(e) Date: Jan. 10, 1994

[87] PCT Pub. No.: WO93/01400

PCT Pub. Date: Jan. 21, 1993

[30] Foreign Application Priority Data

Jul. 8, 1991 [SE] Sweden ................... 9102132

[51] Int. Cl.⁶ ....................................... F01N 3/22
[52] U.S. Cl. .................... 422/168; 422/171; 60/289; 60/307; 123/559.1; 123/564
[58] Field of Search ....................... 422/168, 169, 422/171; 60/289, 307; 123/559.1, 564, 339

[56] References Cited

U.S. PATENT DOCUMENTS

| | | | |
|---|---|---|---|
| 4,404,804 | 9/1983 | Tadokoro et al. | 60/284 |
| 4,488,400 | 12/1984 | Eddy | 60/274 |
| 4,932,368 | 6/1990 | Abe et al. | 123/559.1 |
| 4,995,347 | 2/1991 | Tate et al. | 123/564 |
| 5,044,162 | 9/1991 | Kinoshita et al. | 123/564 |
| 5,119,631 | 6/1992 | Kayanuma et al. | 60/289 |
| 5,133,327 | 7/1992 | Hirosawa et al. | 123/564 |
| 5,150,693 | 9/1992 | Ohnaka et al. | 123/564 |
| 5,190,016 | 3/1993 | Takeda | 123/564 |
| 5,299,423 | 4/1994 | Shiozawa et al. | 123/564 |

FOREIGN PATENT DOCUMENTS

| | | | |
|---|---|---|---|
| 2802429 | 4/1982 | Germany | F01N 3/22 |
| 3213429 | 9/1984 | Germany | F01N 3/22 |
| 3506235 | 9/1985 | Germany | F01N 3/22 |

OTHER PUBLICATIONS

Abstract of JP 63-18122, publ 1988 Jan. 26 vol. 12, No. 222, M 71.

*Primary Examiner*—Robert J. Warden
*Assistant Examiner*—Hien Tran
*Attorney, Agent, or Firm*—Ostrolenk, Faber, Gerb & Soffen

[57] ABSTRACT

A device for injecting air into an exhaust system fitted with catalytic cleaner for a supercharged Otto engine, in whose intake manifold is incorporated an air compressor driven by the engine, which compressor causes the supercharging. An air bleeding duct is arranged for adjustable bleeding of air from the intake manifold and to supply this air as additional air to the catalytic cleaner. This air bleeding duct extends from a point in the intake manifold downstream from the compressor to a point in the exhaust system upstream from the catalytic cleaner. In an inlet section of the intake manifold, located upstream from the compressor, there is an electronically controlled device for idle control of the engine as the air is bled via the air bleeding duct. An extra throttle valve is incorporated in the intake manifold immediately downstream from the bleeding point for maintaining a minimum excess pressure immediately after the compressor in the case of a rich fuel/air mixture and/or before the engine is operating at lambda=1.

9 Claims, 2 Drawing Sheets

DEVICE FOR SUPPLYING EXTRA AIR IN EXHAUST GASES FROM CAR ENGINES UPSTREAM FROM A CATALYTIC CLEANER

This invention relates to an arrangement for injecting air into an exhaust system including a catalytic cleaner for a super charged Otto engine.

STATE OF THE ART

In recent years increasingly tighter requirements have been imposed on the motor industry, out of environmental considerations, among other things, to develop engines and exhaust systems with such characteristics that the quantroes of the substances in the exhaust gases most harmful to the environment can be reduced to much lower values than was previously possible.

Major advances have been made in this effort to achieve cleaner, less harmful vehicle exhaust gases, thanks mainly to the development of engines with more efficient ignition and combustion, combined with exhaust systems fitted with efficient catalytic converters or cleaners (catalytic exhaust cleaners), which reduce the content of harmful components in the exhaust gases. The harmful exhaust components referred to here include mainly carbon monoxide, hydrocarbons and nitrogen oxides, which must be converted by means of the catalytic cleaner to the harmless components carbon dioxide, water and nitrogen, respectively.

To ensure that the catalytic converter operates perfectly, however, the exhaust gases fed into the catalytic converter are required to have a certain minimum temperature and a certain composition.

However, if the exhaust gases contain a certain excess of oxygen, for example, the catalytic material (platinum or rhodium) in the catalytic converter is in most cases only able to bring about efficient combustion of carbon monoxide and hydrocarbons, together with combustible particles, whilst an oxygen deficit will instead result in a reduction in nitrogen oxides. On the other hand, the catalytic converter is obviously also required to provide an effective reduction in all three types of harmful exhaust components mentioned. To ensure that this can be achieved the fuel/air mixture supplied to the engine must be controlled so that an exact stoichiometric mixture is obtained.

The catalytic converter is therefore supplied by an oxygen measuring unit (e.g. lambda probe) in the exhaust pipe and an electronic feedback to the fuel system for continuous fine adjustment of the fuel supply. In this connection the term "lambda" denotes the ratio of the available oxygen to the oxygen required for complete combustion.

Exhaust systems so far developed, with catalytic cleaners, have shown to operate highly satisfactorily as soon as the engine and catalytic converter have reached their intended operating conditions in terms of the operating temperature if particular.

However, when a cold engine, and hence also a cold catalytic converter, is started, particularly in cold weather, a certain time must be allowed for the engine and catalytic converter to reach the intended operating temperature. Before this happens neither the engine nor the catalytic converter are operating under optimum conditions, therefore, which means that there are worse conditions for combustion in the engine and reduced efficiency of the catalytic cleaner in the exhaust system.

In such an initial operating stage, immediately after starting the engine, the latter has not yet reached a stable idling speed, and the fuel/air mixture is not optimum but "rich", i.e. there is an oxygen deficit both in the fuel/air mixture which is supplied to the cylinders for combustion and in the exhaust gases which are supplied to the catalytic cleaner. In this case the engine is not operating at the required lambda value 1 either. Obviously there may also be reasons other than that mentioned above (cold start) why the fuel/air mixture is too rich and/or lambda deviates from the ideal value of 1.

However, the result will be an increased content of harmful substances in the vehicle exhaust gases under these non-ideal operating conditions. In the case of a 4-cylinder, 2 litre engine, for example, the requirement for additional air to the catalytic converter on cold starting may be estimated at approximately 120 litres/min.

One way of tackling the problem of oxygen deficit in the exhaust gases supplied to the catalytic cleaner is to arrange for the supply of extra air in the exhaust duct upstream from the catalytic cleaner. In U.S. Pat. No. 4,406,126, for example, a system is described for such a supply of extra air (secondary air) to an internal combustion engine fitted with an exhaust driven turbocompressor. In this case, however, the turbocompressor is not used but extra air is supplied by using the pulsing exhaust gas flow from exhaust ports not connected to the turbine of the turbocompressor to draw in extra air into the exhaust duct. On the other hand, such an arrangement cannot be used for supercharged engines because of the exhaust gas back pressure.

OBJECTIVE OF THE INVENTION

The objective of this invention is therefore to supply compressed air by simple means—in a supercharged Otto engine with a mechanically driven air compressor (with internal compression) in the intake manifold—for use as oxidizing additional air which is supplied to the engine exhaust gases before they reach the catalytic cleaner, enabling the latter to provide efficient exhaust gas cleaning despite the rich fuel/air mixture and/or the lambda value deviating from 1. A further objective of the invention is to provide a design solution which is simpler and operates better than known arrangements, for example those with a two-stage compressor (compare U.S. Pat.No. 4,488,400).

The basic concept of the invention involves the use of the mechanically driven compressor generating charging air, fitted to this type of engine, for also supplying the separate additional air required for optimum operation of the catalytic converter. The use of a proportion of the compressed air flow generated by the compressor for the specific purpose of supplying this additional air must not, however, be allowed to cause any reduction in engine speed. The foregoing and other objects are achieved in accordance with the present invention by an arrangement including an air bleeding duct having an inlet connected to a bleeding point in the intake manifold located downstream of the compressor and having an outlet connected to a supply point in the exhaust system upstream of the catalytic cleaner. The arrangement further includes means disposed upstream of the compressor for controlling the idle speed of the engine by compensating for the air bled to the catalytic cleaner, which means includes an air throttle in the intake manifold and a shunt duct having first and second ends, the first end being connected to the intake manifold on one side of the throttle and the other end being connected to the intake manifold at an opposite side of the air throttle. A control valve is located in the shunt duct, the control valve being controlled by a motor which in turn is controlled by a control unit supplied with control signals from different engine parameter sensors.

The arrangement according to the invention has the major advantage that the existing mechanical supercharger (the compressor) is also used as a compressed air source for the additional air required for optimum operation of the catalytic converter in a rich fuel mixture and/or before the engine is able to operate at lambda=1. The design according to the invention is therefore highly cost effective because the engine does not need to be fitted with a new, extra device for generating the required compressed air. The requirement that the additional air must consist of air at excess pressure is obviously due to the fact that the exhaust gas pressure in the exhaust pipe upstream from the catalytic cleaner is also an excess pressure which must be overcome by the pressure of the additional air for this air to be injected into the exhaust system upstream from the catalytic converter. In certain operating cases extra air (additional air) may also be supplied periodically to the catalytic converter for burning away lead deposits—except during the starting process (compare Because bleeding compressed air through the air bleeding duct would result in a slightly reduced air pressure in the intake manifold (and hence reduced idling speed), if no compensatory measure has been taken at the same time, the invention also provides for the arrangement of an idle control upstream from the compressor.

In practice it is desirable to ensure the maintenance of a certain minimum excess pressure in the intake manifold, regardless of the bleeding of additional air for the catalytic converter which takes place via the air bleeding duct. In order to maintain such a desirable excess pressure, e.g. at least 0.6 bar, in intake manifold in the vicinity of the bleeding point, immediately after the compressor, an extra throttle valve is suitably inserted in the intake manifold immediately downstream from the bleeding point.

The idle control arranged upstream from the compressor, with an electronically controlled device, should preferably provide a situation where the areas on opposite sides of an air throttle arranged in the intake manifold of the compressor are interconnected by a shunt duct passing the air throttle and incorporating a control valve itself controlled by a motor, which is in turn controlled by a control unit which is supplied with control signals from different engine parameter sensors. In practice a temperature sensor may be fitted in the catalytic cleaner, a speed sensor in the engine, a temperature sensor in the engine, a lambda probe in the exhaust manifold, and a pressure sensor in the intake manifold between the outlet side of the compressor and the extra throttle valve in the intake manifold.

For the adjustable air bleeding via the air bleeding duct a controllable valve may be suitably incorporated in the air bleeding duct to bring about the adjustable air bleeding via the duct, which valve is controlled by an associated servomotor connected to an electrical control unit. The motor controlled valve used for this purpose may be a position- or PWM-controlled valve which opens when relevant engine parameters (such as temperature, lambda value and speed) indicate conditions with a rich fuel/air mixture. By "PWM-controlled" valve is meant a valve with pulse width modulated opening/closing. The time of an open-closed cycle is constant in this case, but by varying the open time a reverse variation of the closing time is obtained. For example a longer open time gives a shorter closing time with an unchanged total cycle time.

The motor controlled control valve in the shunt duct passing by the air throttle in the intake manifold therefore provides the idle control which maintains an acceptable engine speed regardless of the air flow discharged via the air bleeding duct to the catalytic converter. A motor controlled control valve suitable for this purpose may be an AIC valve or a rotary slotted valve (for a definition of AIC valve see the explanation below).

BRIEF DESCRIPTION OF THE DRAWINGS

The invention will now be explained and described in greater detail with reference to embodiments shown in the attached drawings.

DESCRIPTION OF EMBODIMENTS

Figure 1:
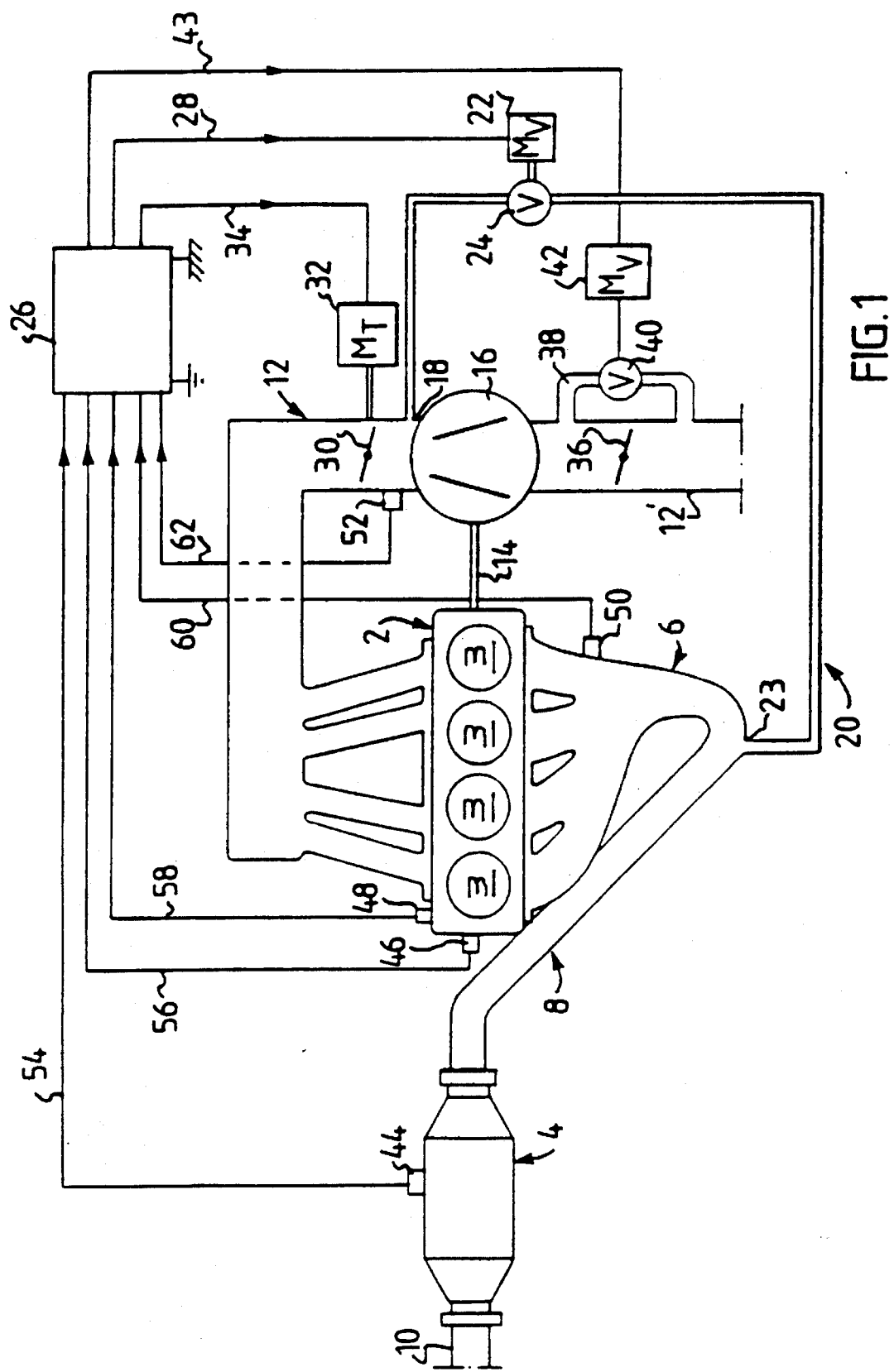
FIG. 1 is a diagrammatic circuit and component diagram for a supercharged Otto engine fitted with a device according to the invention.

In both figures in the drawing a four-cylinder engine is generally denoted by 2, and a catalytic exhaust cleaner incorporated in the engine exhaust system is generally denoted by 4. The exhaust side of the engine is connected to catalytic cleaner 4 by an exhaust manifold 6 and an exhaust port 8. The catalytic cleaner is connected to the ambient atmosphere by an exhaust pipe 10. The combustion air to the engine 2 (which is assumed here to be a fuel injection engine) is supplied to engine cylinders 3 via an intake manifold generally denoted by 12. The upstream section of this intake manifold 12 includes an air compressor 16, which is driven mechanically from the engine 2 via a shaft 14, and which supercharges the engine. This compressor is preferably a screw compressor, but other types of compressors are also conceivable, e.g. Roots' blower type compressor. However, the latter type operates without internal compression, i.e. it operates against full pressure. When the compressor is a screw compressor, its internal compression may be of the order of 1:1.6–1.8, possibly even higher.

An air bleeding duct, generally denoted by 20, extends from a bleeding point 18 in the intake manifold wall, situated downstream from compressor 16, to a point 23 at the upstream end of exhaust duct 8. A control valve 24, which is itself controlled by a servomotor 22, is incorporated in air bleeding duct 20. Valve 24 controls the air flow which is supplied via bleeding duct 20 to catalytic cleaner 4, after having been blown into exhaust duct 8 at the point of supply 23. Servomotor 22 is in turn controlled by means of electrical signals received from an electronic control unit 26 via a signal cable 28.

To enable a desired excess pressure, let us say at least 0.6 bar, to be maintained in intake manifold 12, an extra throttle valve 30 is fitted in the intake manifold immediately downstream from bleeding point 18. Throttle valve 30 is controlled by a servomotor 32, which is in turn controlled by means of electrical signals which are received from control unit 26 via signal cable 34. The extra throttle valve 30 is controlled by means of control unit 26 so that the defined minimum excess pressure, e.g. 0.6 bar, can be maintained immediately downstream from compressor 16 under operating conditions, with a rich fuel/air mixture and/or before the engine operates at lambda=1, which require the supply of additional air to catalytic cleaner 4 by bleeding via bleeding duct 20.

To compensate for the pressure reduction in intake manifold 12 which would result from the bleeding of air through bleeding duct 20 (and which would lead to a reduced idling speed), an electronically controlled idle control device is arranged upstream from compressor 16. This idle controlling compensation device incorporates an air throttle 36 arranged in an inlet section 12' of intake manifold 12 located upstream from compressor 16. The areas before and after air throttle 36 are interconnected wa a shunt duct 38, which runs past air throttle 36. The air flow through this shunt duct is controlled by means of a control valve 40 which is itself controlled by a servomotor 42, which is in turn controlled by means of electrical signals received from control unit 26 via control cable 43. Control valve 40 incorporated in shunt duct 38 is ideally an AIC valve/slotted valve which controls an extra air supply to compressor 16 to compensate for the air flow to catalytic converter 4 which is bled via air bleeding duct 20. Due to this flow of air into compressor 16, increased by control valve 40, the desired idling speed of engine 2 can be maintained regardless of the additional air flow discharged to the catalytic converter. The AIC valve performs the dual role firstly of compensating for long-term variations, avoiding idling adjustment, and secondly of compensating for instantaneous idling speed reductions as the load increases.

To enable electronic control unit 26 to control motor 24 of the position- or PWM-controlled valve 24 and motor 42 of control valve 40 the control unit must be supplied with control signals representing the engine parameters relevant in this connection in the embodiment shown, these parameters are firstly the temperature in catalytic cleaner 4, secondly the speed and temperature of engine 2, thirdly the temperature of the exhaust gases in exhaust manifold 6, fourthly the air pressure in intake manifold 12 in the area between the outlet side of compressor 16 and the extra throttle valve 10. These engine parameters are detected by means of a sensor 44 in catalytic converter 4, sensors 46 and 48 in engine 2, a sensor 50 in exhaust manifold 6, and a sensor 52 in the intake manifold wall. The signals from these five sensors are transmitted to control unit 26 via signal cables 54, 56, 58, 60 and 62.

For example, if the operation of the catalytic converter is required to be controlled additional air (extra air) can be supplied instantaneously, and it can then be determined how quickly the catalytic converter reacts by means of a lambda probe in exhaust pipe 10, downstream from catalytic converter 4, or by temperature measurement (sensor 44) on the catalytic converter.

In the arrangement described above there is also a requirement for guaranteeing a reliable starting function wherever possible. To achieve this it should be ensured that the extra throttle valve 30 is set to its fully open position during cranking of the starter motor. This avoids unnecessary pumping losses which may otherwise occur. Such complete opening of throttle valve 30 can be brought about fairly easily by means of an electrical control system which includes control unit 26, described above, with the associated sensors and servomotor 32.

With regard to servomotor 32 and sensor 52 of the extra throttle valve 30 it must be generally pointed out that a simple, self-regulating, purely mechanical/pneumatic design variant with a pressure controlled load measuring device fitted with a diaphragm, is conceivable as an alternative. Such a load measuring device consists mainly of a closed pressure casing (housing), the inside of which is divided, by means of an elastic Darttnon (e.g. a rubber diaphragm) into two pressure chambers separated by the wall. A control rod, which extends through one of the pressure chambers, and projects through an opening in the outer wall of that pressure, and which at its free end is connected directly or indirectly to the throttle valve for controlling the same, runs from the center of the partition on one of its sides. The position of the partition—and hence of the control rod—is determined by the pressure difference prevailing between the pressure chambers. In one of the pressure chambers, for example, a control pressure is maintained which is removed upstream from throttle valve 30, whilst the other pressure chamber, for example, is connected to the ambient atmosphere.

With regard to the idle control device with air throttle 36 upstream from compressor 16 it should also be mentioned that it would be theoretically possible to locate throttle 36 after, i.e. downstream from, compressor 16 instead. In this case, however, a waste gate valve would be required to "blow away" the excess compressed air generated by the compressor, because there would then be no throttling, of course, on the suction side of the compressor. The compressor would therefore perform a certain amount of unnecessary work, which is of course not desirable in itself but at the same time provides a faster response to the control, which may be desirable in some cases.

Figure 2:
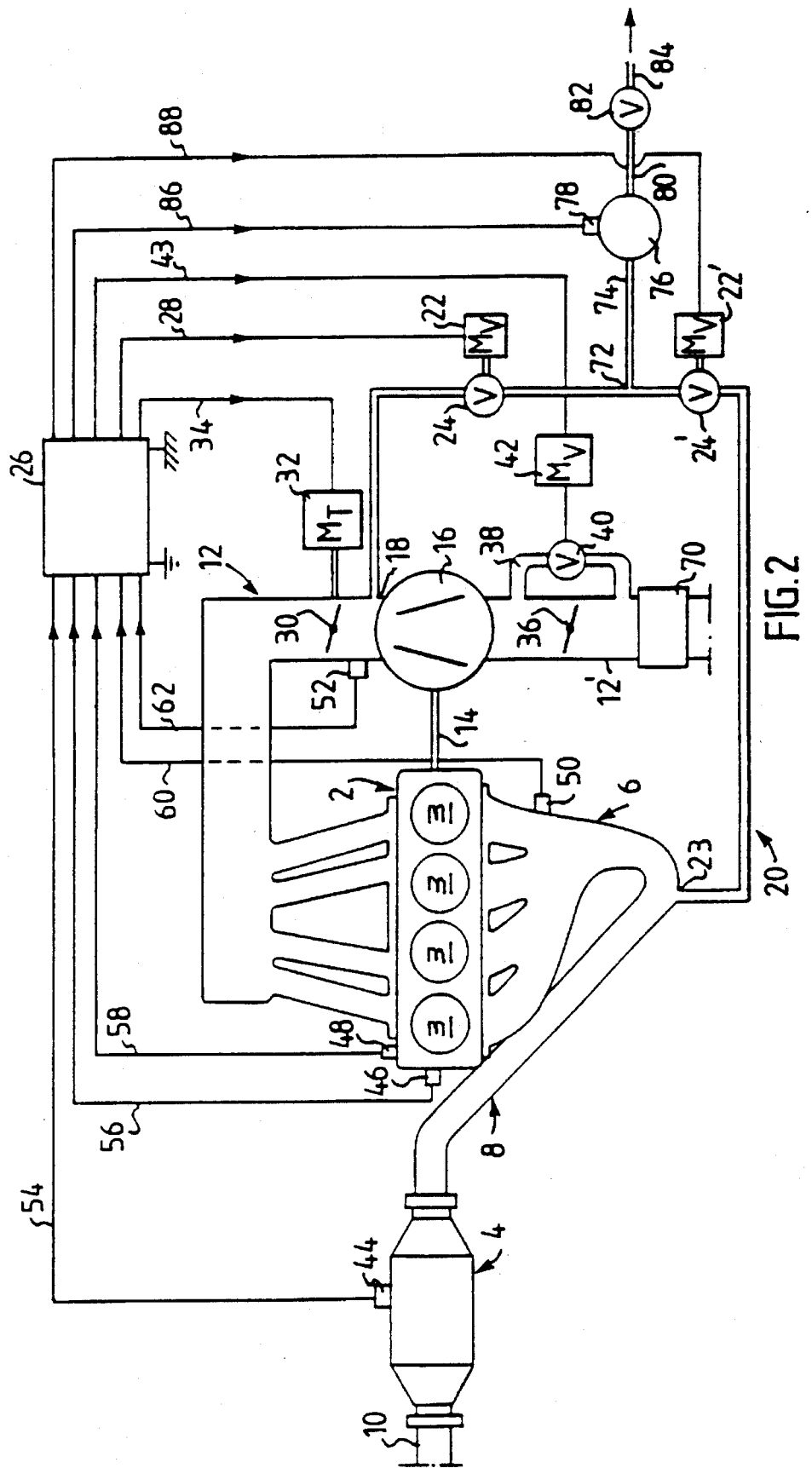
FIG. 2 is a similar diagram for an alternative design with certain additional equipment, among other things an air mass meter in the intake manifold.

Reference is now made to the alternative design shown in FIG. 2, which differs from that shown in FIG. 1 in that certain supplementary equipment has been added. The description below is confined mainly to the added components and parts.

In the design shown in FIG. 2 an air mass meter 70 is arranged in inlet section 12' of intake manifold 12. The air mass meter measures the mass of air which is sucked antbrough inlet section 12' of intake manifold 12 per unit of time. The optimum open time for the fuel injection valves of engine 2, e.g. in the control unit, can be calculated on the basis of the present engine speed (which can be obtained by means of speed sensor 46) and the air mass flow measured by means of air mass meter 70. Air mass meter 70 is connected to control unit 26 by a signal cable (not shown). The fuel is injected into cylinders 3 of engine 2 via separate fuel injection nozzles (not shown), whose operation is controlled from control unit 26 via signal cables (not shown).

The bleeding of the additional air (extra air) to the catalytic converter affects the amount of air which reaches the engine cylinders. The air mass meter located upstream from the compressor measures the total quantity of air supplied to the cylinders and the catalytic converter. The actual quantity of air which reaches the cylinders—to which the fuel supply must be adapted—can suitably be obtained by correcting the signal from the air mass meter as a function of the opening interval/degree of opening of valve 24.

The idle control and air mass measurement provide the following: more constant engine speed, better cold starting and warming up characteristics, increased idling speed when an air-conditioning system is connected, for example, compensation for reduction in engine speed resulting from increased loading (for example, by the power steering pump and generator charging), as well as further characteristics/functions aimed for.

At a point 72 on air bleeding duct 20 located downstream from control valve 24 there is a branch 74 in the form of a bleeding duct which leads to a pressure accumulator 76, from which compressed air, at a controlled flow rate, can be bled via a pipe 80 and control valve 82 for subsequent feeding, via pipe 84, to relevant accessories driven by or consuming compressed air (compare U.S. Pat. No. 3,934, 413), e.g. inflatable door seals, servomotors, air assisted fuel injection etc. Pressure accumulator 76 is also fitted with a pressure sensor 78 whose output signal is transmitted to control unit 26 via a signal cable 86, and an extra control valve 24' is inserted in air bleeding duct 20 downstream from branch point 72. This valve 24' is controlled by means of a motor 22', which is in turn controlled from control unit 26 via a signal cable 88.

I claim:

1. A device for injecting air into an exhaust system of a supercharged Otto engine, which device comprises:

a mechanical compressor for providing compressed air to an Otto engine to supercharge the same, the engine having an intake manifold and an exhaust system including a catalytic converter, said compressor being disposed in the intake manifold;

an air bleeding duct having an inlet connected to the intake manifold at an air bleeding point located downstream of the compressor and having an outlet connected to a supply point in the exhaust system located upstream of the catalytic converter, the air bleeding duct bleeding air from the intake manifold to the exhaust system;

means for sensing the values of a plurality of engine parameters; and means arranged upstream of the compressor for controlling an idle speed of the engine by compensating for the air flow bled from the intake manifold to the catalytic converter, said controlling means including a first throttle valve arranged in the intake manifold upstream of the compressor, a shunt duct having first and second ends, the first end being connected to the intake manifold on one side of the first throttle valve and the second end being connected to the intake manifold on an opposite side of the first throttle valve, a control valve disposed in the shunt duct, a motor for controlling the control valve and a control unit for controlling the motor in accordance with the sensed values of the engine parameters.

2. A device according to claim 1, wherein the sensed engine parameters include the temperature in the catalytic cleaner, the speed including the idle speed of the engine, the temperature of the engine, the temperature of exhaust gases in an exhaust manifold of the exhaust system and the air pressure in the intake manifold.

3. A device according to claim 1 including means for maintaining an excess pressure in the intake manifold in the vicinity of the bleeding point.

4. A device according to claim 3, wherein the means for maintaining the excess pressure includes an second throttle valve disposed downstream of the compressor and immediately downstream of the bleeding point.

5. A device as in claim 4, wherein the means for maintaining the excess pressure is constructed and arranged to maintain a pressure of at least 0.6 bar.

6. A device according to claim 4, including means disposed in the air bleeding duct for adjusting the air flow through the air bleeding duct.

7. A device according to claim 6, wherein the means for adjusting air flow through the air bleeding duct includes a controllable valve disposed in the air bleeding duct, a first servo motor for controlling the controllable valve, the first servo motor being controlled by the control unit.

8. A device according to claim 7, wherein the means for maintaining the excess pressure further includes a second servo motor controlled by the control unit for controlling the second throttle valve.

9. A device according to claim 8, wherein said sensing means includes a pressure sensor arranged in the intake manifold in the area between the compressor and the second throttle valve, the pressure sensor being connected to the control unit so that the second servo motor connected to the second throttle valve is controlled in accordance with the pressure sensed by the pressure sensor.

* * * * *